May 13, 1969  M. J. ZUGEL  3,443,455

INTERMITTENT MOTION DEVICE

Filed May 3, 1967  Sheet 1 of 3

INVENTOR.
MARTIN J. ZUGEL
BY *Kramer & Stenger*
ATTORNEYS

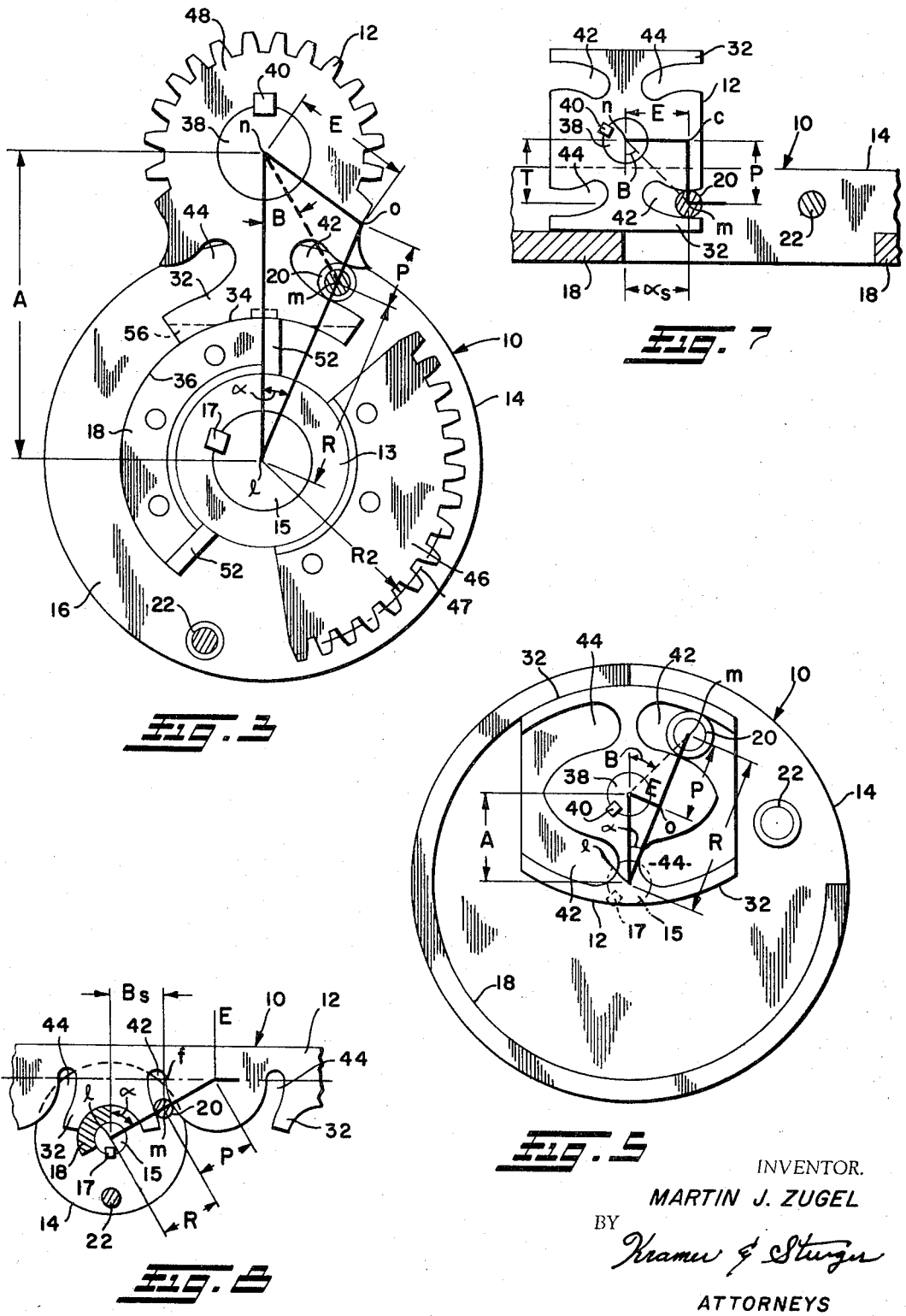

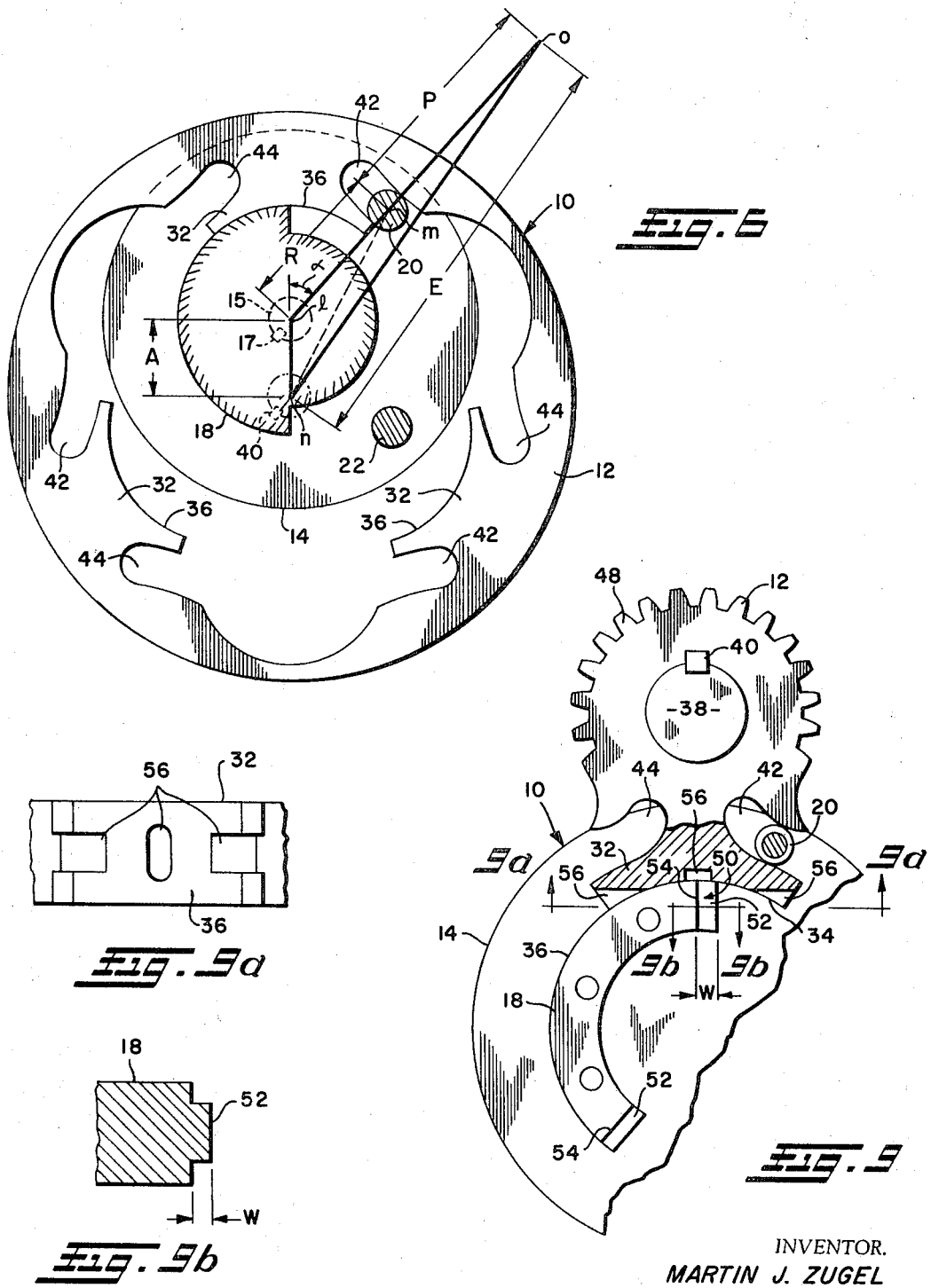

United States Patent Office 3,443,455
Patented May 13, 1969

---

3,443,455
INTERMITTENT MOTION DEVICE
Martin J. Zugel, 1198 E. 170th St.,
Cleveland, Ohio 44110
Filed May 3, 1967, Ser. No. 635,870
Int. Cl. F16h 27/06
U.S. Cl. 74—820                                    11 Claims

---

ABSTRACT OF THE DISCLOSURE

An indexing device comprising a driven mechanism with circular slots for receiving normally uniformly moving pins used to periodically accelerate and decelerate the driven mechanism from and back to a standstill.

---

Prior art devices

Probably the best known indexing device for imparting intermittent motion is the Geneva mechanism. This mechanism employs a single pin moving in and out of straight slots radiating from the center of the driven mechanism, for periodically accelerating and decelerating the driven mechanism to and from a standstill. The Geneva mechanism, however, has many limitations. For example, the number of stations of such a mechanism cannot be smaller than three, or the partial movement of the of the driven shaft cannot exceed ⅓ revolution, except in very modified mechanism. Yet, a frequent requirement is to impart to a shaft, full revolutions with intermediate standstills. Geneva mechanisms leave little freedom of design because, for a given number of stations and a given center distance, all relevant dimensions and kinematic relations are determined. Another unfavorable feature of Geneva mechanisms is that the duration of motion decreases while the partial movement of the driven gear is increasing, which accounts for the unfavorable kinematic conditions of mechanisms having a small number of stations.

Other well known indexing devices are external star wheel mechanisms which do not have any of the aforementioned restrictions of Geneva mechanisms. These mechanisms comprise a driven mechanism or star wheel and a driving mechanism having at least two spaced pins or rollers, the first pin engaging and accelerating the star wheel from a standstill, and the second pin decelerating or returning the star wheel back to a standstill. A gear segment is provided on the driving mechanism intermediate the pins, for engaging a mating gear segment correspondingly disposed on the star wheel to uniformly drive the star wheel between periods of acceleration and deceleration. The star wheel is provided with a pair of oppositely disposed and similar curved slots for receiving the accelerating and decelarting pins.

The design or configuration of the pin receiving slots in the star wheel is one of the most essential features, and determines the manner of acceleration and deceleration. A very favorably star wheel mechanism is described in a treatise titled "Mechanisms For Intermittent Motion," by Otto Lichtwitz. This treatise is serialized in the December 1951 through March 1952 issues of the publication titled, "Machine Design." This particular mechanism uses a star wheel having pin receiving slots which are formed on epicycloidal curves. The formulas and machinery described in this article for computing and cutting these slots are extremely complex, especially the cutting or milling of these slots. As a result, such slots are usually roughly formed and then finished by hand filing.

Mr. Lichtwitz states that, "The shape of the accelerating slot is determined by the requirement that the roller must recede from the slot when, subsequently, both gears are rotating with uniform velocity. The center line of the slot must, therefore be a part of an epicycloid which is traced by a point on the circumference of the pitch circle 1 of the driving gear when rolling without sliding on the exterior of the pitch circle 2 of the driven gear."

It is apparent from this description that once the mating gear segments of the uniform driving sections are engaged, the accelerating pin is figuratively trying to escape from the slot and does not impart motion to the star wheel. The positive driving action is provided by the engaged mating gear segments. In this respect, then, the accelerating pin during this time, is not accelerating or providing positive control of the motion being imparted to the star wheel.

This is an important difference in using the circular pin receiving slots of my invention, as the accelerating pin continues to accelerate the star wheel as is moves out of the circular slot. This so called "positive control" of the star wheel means that it is not essential for the gear segments to be in mating engaged relation at the point where the accelerating pin begins receding from the slot. Because of this, the time periods for accelerating and decelerating can be varied. This is not so when using slots formed on epicycloidal curves.

This article also indicates that the accelerating and decelerating pins must coincide with the pitch line of the gear segments in the uniform driving motion section. The location of the pins are not so restricted when using circular slots in the star wheel. Thus, it can be appreciated that the designs for star wheel mechanisms with slots formed on epicycloidal curves, are more rigid because of the fixed relationships between accelerating, decelerating, and uniformly driving the star wheel.

The problems encountered when using the above mentioned Geneva and star wheel mechanisms are substantially eliminated by providing circular slots, or slots formed on simple radii in the driven mechanism, for receiving the accelerating and decelerating pins on the driving mechanism.

The following description of the invention will be better understood by having reference to the annexed drawing, wherein:

FIGS. 3–8 are plan views of other embodiments of indexing devices employing circular slots;

FIG. 9 is a fragmentary plan view of a star wheel mechanism having a portion of the star wheel removed to expose a keying device for extending the lock between the locking drum and shoe of the driving and driven mechanisms;

FIG. 9a is a fragmentary sectional view taken in the plane indicated by the line 9a—9a of FIG. 9; and FIG. 9b is a fragmentary sectional view taken in the plane indicated by the line 9b—9b of FIG. 9.

Environment of the invention

Figure 1:
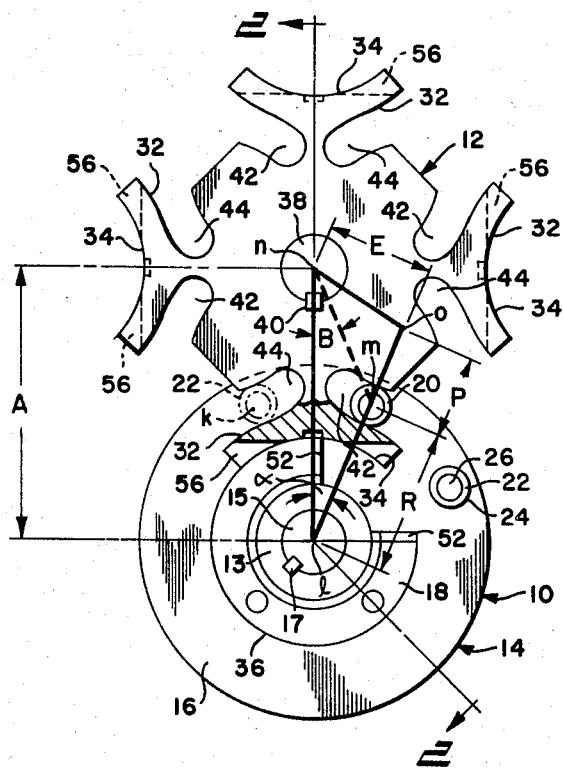
FIG. 1 is a plan view of an embodiment of the invention.
Figure 2:
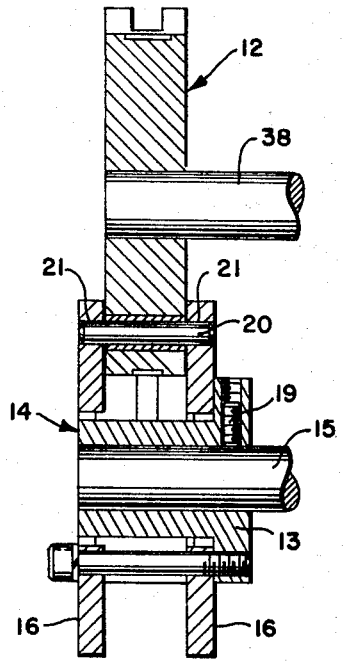
FIG. 2 is a sectional view of the embodiment of FIG. 1 taken in the plane indicated by the line 2—2 of FIG. 1.

Referring generally to the drawing, and more particularly to FIGS. 1 and 2, there is shown an intermittent motion or indexing device, generally indicated at 10. The intermittent motion devices illustrated in FIGS. 1 and 3 have basically the same design properties and resemble the afore-mentioned Geneva and star wheel mechanisms, respectively.

The intermittent motion device 10 comprises a mechanism 12 intermittently driven by a normally uniformly moving mechanism 14, which with the exception of the embodiment shown in FIG. 6, is mounted for rotation about its longitudinal axis or center point ($l$).

Excepting FIGS. 5 and 6, the driving mechanism 14 preferably comprises two similar discs 16 conventionally bolted together in axially aligned spaced relation on a collar 13 which, in turn, is keyed and locked to a rotating shaft 15 by any suitable means, e.g. key 17 and set screw 19.

A locking drum 18 is concentrically disposed on the driving mechanism 14 between the discs 16.

An accelerating pin 20 is eccentrically disposed on the driving mechanism 14 and extends between the discs 16. The accelerating pin 20 first encounters the driven mechanism 12 and accelerates it from a standstill to a predetermined velocity. The accelerating pin 20 is secured between the discs 16 by any suitable means, e.g. it is frictionally engaged in aligned holes 21 of the discs 16.

A decelerating or retarding pin 22 is similarly secured between the discs 16 in arcuate spaced relation from the accelerating pin 20 for decelerating or returning the driven mechanism 12 moving at said predetermined velocity, back to a standstill.

The accelerating and decelerating pins 20 and 22, are preferably similar and comprise a collar 24 intermediate the discs 16, rotatably surrounding a pin or dowel 26 whose ends are frictionally engaged in the holes 21 of the discs 16. The collar 24 is free to rotate about the pin 26, in order to reduce frictional forces as the pins become engaged with and disengaged from the driven mechanism 12.

The accelerating pin 20 is radially spaced from the center point ($l$) of the driving mechanism 14, a distance (R). The decelerating pin 22 is likewise radially spaced from the center point ($l$) a similar distance (R).

The driven mechanism 12 of FIGS. 1 and 2 is known as a 4-stop mechanism, in that it employs four similar locking shoes 32, for engaging the locking drum 18 on the driving mechanism 14, to keep the driven mechanism 12 at a standstill for a predetermined time or through a predetermined arc relative to the rotating driving mechanism 14. The locking shoes 32 are equally radially spaced from the longitudinal axis of the driven mechanism 12 or center point ($n$) about which said mechanism rotates, and extend into the driving mechanism 14 between the discs 16 for engaging the accelerating and decelerating pins 20 and 22. Each locking shoe 32 has a curved surface 34 for mating sliding engagement on a correspondingly curved surface 36 of the locking drum 18.

The driven mechanism 12 is similarly keyed to a shaft 38 centrally aligned with the longitudinal axis of the driven mechanism 12 by any suitable key 40, and intermittent rotary motion imparted to the driven mechanism 12 is consequently transferred to the shaft 38. Such movement can be utilized, for example, in feeder slides, or conveying systems where it is desired to periodically transfer parts to different stations where the part is worked on for a predetermined length of time.

The invention

A pair of similar slots 42 and 44 are oppositely disposed in the driven mechanism 12 adjacent each locking shoe 32, for receiving the accelerator pin 20 and decelerator pin 22, respectively. The pin receiving slots 42 and 44 are circular slots, i.e. they are slots formed on simple radii. The accelerator pin receiving slot 42 is formed on a simple radius (P) whose center is located on a straight line passing through the center points ($l$) and ($m$) of the driving mechanism 14, and accelerator pin 20, respectively, when the accelerator pin 20 is positioned in the slot 20 for engaged and driving relation with the driven mechanism 12.

The decelerator pin receiving slot 44, is similarly formed on the radius (P) whose center is located on a straight line passing through center points ($l$) and ($k$) of the driving mechanism 14 and decelerator pin 22, respectively, when the decelerator pin 22 is positioned within the slot 44 for disengaging relation with the driven mechanism 12. (Note dotted position of accelerator pin 22 in FIG. 1).

The star wheel mechanism 10 illustrated in FIG. 3 is somewhat different in that it employs a star wheel as a driven mechanism 12. Also, the driving mechanism 14 has a uniform driving section 46 in the form of a toothed gear segment intermediate the accelerating pin 20 and decelerating pin 22. The gear segment 46 is designed for mating meshing engagement with a toothed gear segment 48 correspondingly disposed on the star wheel 12 intermediate the accelerator and decelerating pin receiving slots 42 and 44.

Method of determining minimum and maximum slot radii for each embodiment illustrated in the drawing It has been found that within the input and output motion periods of the driving and driven mechanisms 14 and 12, respectively, the intermittent motion device 10 can be compared to a simple 4-bar linkage mechanism. Using the analogy formulas can be derived for computing the pin locating radius (R) and the limitations or range of the slot radius (P). Working drawings of the embodiments similar to those shown in the drawing, can be prepared by a competent draftsman when the values of R and P have been determined from the known quantities, e.g. angles alphas ($\alpha$) and beta ($\beta$), and the center distance A between the driving and driven mechanisms.

Class I external mechanisms

Referring again to FIGS. 1–3, the heavier lines ($ln$), ($lm$), ($mo$), and ($no$), represent links of a 4-bar linkage mechanism. The line ($ln$) is the center distance (A) between the driving and driven mechanisms 14 and 12, respectively, and is usually known or set by the physical limits of the indexing device 10.

The total input motion or angle through which the driving mechanism 14 moves, is the summation of the angles through which the accelerating and decelerating pins 20 and 22 move. Since each pin moves two alpha ($2\alpha$), the total input motion is four times the angle alpha ($4\alpha$). Similarly, the total output motion or angle through which the driven mechanism 12 correspondingly moves is four times the angle beta ($4\beta$).

The total input motion and output motion are determinable from the work periods required of the indexing device 10.

Using the 4-bar linkage analogy, the following formulas were derived for determining the pin locating radius (R), and minimum slot radius (P) at which this mechanism can operate.

Formula I $$R = A \frac{\sin \beta}{\sin (\alpha + \beta)}$$

Formula II $$\text{minimum } P > \frac{R(A - A \cos \alpha)}{A - 2R + A \cos \alpha}$$

It was also determined that the maximum slot radius (P) approaches infinity.

Typical design of an indexing device illustrated in FIGURE 1

The total angular indexing motion theta ($\theta$) is four times the angle alpha ($4\alpha$), the total angular output motion delta ($\delta$) is four times the angle beta ($4\beta$). Also, the mechanism illustrated in FIG. I is being compared to a Geneva mechanism in which the total input motion or ($4\alpha$) is known to be 90°. Knowing this, the angle alpha ($\alpha$) is determined as being 22½°.

The total output motion is found by dividing the total number of degrees in a circle (360°) by the number of stops or locking shoes, which, in this case, is 4. The total output motion or four beta ($4\beta$) is therefore 90°. From this, angle beta ($\beta$) is determined as being 22½°.

Assuming the mechanism requires a center distance (A) of 2″, we can readily compute the minimum slot radius (P) from Formulas I and II. The kinematic properties for various radii (P) can be computed and compared. The radius (P) producing the best or most desired kinematic or pin force properties is then selected and used to form the circular slots in the driven mechanism 12.

Class II external mechanisms

Figure 4:
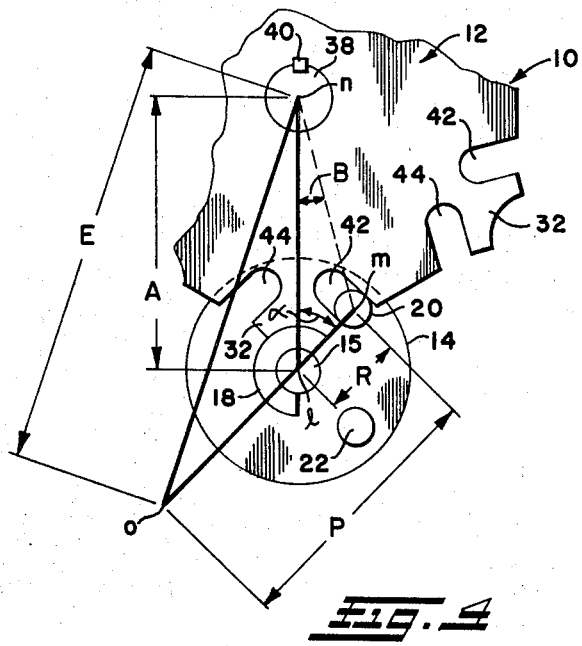

Referring more particularly to FIG. 4, there is shown an indexing mechanism or intermittent motion device 10 with more than four stops on the driven mechanism 12. The bars of the 4-bar linkage are represented in heavier lines. Utilizing this analogy, the following formulas were derived for determining the pin locating radius (R), and minimum slot radius (P) at which this mechanism can operate.

Formula III $$R = A \frac{\sin \beta}{\sin (\alpha + \beta)}$$

Formula IV    minimum $P > R$

It was found that the maximum slot radius (P) approaches infinity.

Class I internal mechanisms

Referring more particularly to FIG. 5, there is shown an internal indexing mechanism 10 having two stops or shoes 32 with a total angular indexing motion of 90° and an output motion of 180°. An internal mechanism is more compact and easier to manufacture. Moreover, it has no uniform motion sections necessitating the use of gear segments. Although the rotating members of internal mechanisms usually reach higher velocities than similar members of external mechanisms, their acceleration and deceleration from and back to a standstill is generally not as rapid.

The bars of the 4-bar linkage are shown in heavier line. Utilizing this analogy, the following formulas were derived for determining the pin locating radius (R) and minimum slot radius (P) at which the mechanism can operate.

Formula V $$R = A \frac{\sin \beta}{\sin (\beta - \alpha)}$$

Formula VI $$\text{minimum } P > -\frac{R(A - A \cos \alpha)}{A - 2R + A \cos \alpha}$$

It was also determined that the maximum slot radius (P) should be smaller than the pin locating radius (R).

Class II internal mechanism

Referring more particularly to FIG. 6, there is shown a three stop internal mechanism having a total indexing motion of 180° and a total output motion of 120°, giving an input angle alpha ($\alpha$) of 45° and an output beta ($\beta$) of 30°.

The bars of the 4-bar linkage are similarly shown in heavier line. Once again utilizing the analogy, the following formulas were derived for determining the pin locating radius (R) and the minimum slot radius (P) at which the mechanism will operate.

Formula VII $$R = \frac{A \sin \beta}{\sin (\alpha - \beta)}$$

Formula VIII $$\text{minimum } P > AR \left[ \frac{1 - \cos}{2R + A(1 + \cos \alpha)} \right]$$

It was also determined that the maximum slot radius (P) approaches infinity. The letter $l$, as used in Formula VIII, refers to numeral one.

Class I rack mechanisms

Referring more particularly to FIG. 7, there is shown a rack-type indexing mechanism 10 wherein linear input motion of the accelerating and decelerating pins 20 and 22, respectively, is translated into intermittent rotary output motion of the driven mechanism 12.

The driving rack or mechanism 14 in this particular case, is provided with spaced locking blocks 18 rather than drums, for engaging the locking shoes 32 of the rotatably mounted driven mechanism 12.

The links shown in heavier line are analogous to an offset slider crank which, in turn, is the equivalent of a 4-bar linkage with an infinite link. Utilizing this analogy, the following formulas were derived for determining the minimum slot radius (P) at which the mechanism can operate.

Formula IX    $T = \alpha_s \cot \beta$

Formula X $$\text{minimum } P > \frac{\alpha_s^2}{4T}$$

or

Formula XI $$\text{minimum } P > \frac{\alpha}{4 \cot \beta}$$

T is the shortest distance between the accelerating pin 20 and the center point ($n$) around which the driven mechanism 12 rotates. The pin locating radius (R), in this particular case, approaches infinity, therefore, the maximum and minimum slot radii (P) cannot be expressed in terms of the pin locating radius (R). It was also determined that the maximum slot radius (P) approaches infinity.

Class II rack mechanisms

Referring more particularly to FIG. 8, there is shown a rack-type indexing mechanism 10 for translating uniform rotary motion of the driving mechanism 14 into intermittent linear motion of the driven mechanism or rack 12. The links in heavier line are, similarly, analogous to a slider crank (Class I rack mechanisms). Utilizing this analogy, the following formulas were derived for determining the pin locating radius (R) and the minimums slot radius (P) at which the mechanism can operate.

Formula XII $$R = \frac{B_s}{\sin \alpha}$$

Formula XIII $$\text{minimum } P > \frac{R(1 - \cos \alpha)}{(1 + \cos \alpha)}$$

$B_s$ is one-fourth the total linear output motion. It was also determined that the maximum slot radius (P) approaches infinity. The letter $l$ as used in Formula XIII, refers to numeral one.

Extended key locking mechanism

Referring more particularly to FIGS. 1–3, 9, 9a, and 9b, there is shown a means generally indicated at 50, for extending the engagement between the locking shoe 32 and locking drum 18.

This locking engagement is extended immediately prior to the driven mechanism 12 engaging the accelerating pin 20, and after the decelerating pin 22 disengages the driven mechanism 12. The extended locking means 50 comprises a key or tongue 52 extending from each end 54 of each locking drum 18. A configured recess 56 is formed in the matingly configured surface 34 of each locking shoe 32, for receiving and letting the keys 52 pass therethrough. Thus, the engagement between the locking shoe 32 and drum 18 is extended by the width $w$ of the keys 52 without hindering relative movement of the driving and driven mechanisms with respect to each other.

Summary

Thus, there has been provided a new and novel intermittent motion or indexing device employing circular slots for reciving the accelerating and decelerating pins. Such slots permit adjusting the time or dwell periods of acceleration and deceleration to produce the best possible kinematic properties for any given design requirement. It should be noted that the open ends of the circular slots, prior to the point of engagement or disengagement between the pins and the driven mechanisms 12, can be tapered or curved to facilitate entry of the pins into the slots without detracting from the spirit of the invention. However, once the pin enters the slot and engages the driven mechanism, it is essential that the slot be circular.

The extended key lock provided between the driving and driven mechanisms, is also highly beneficial to the operation of the indexing device as it acts to stabilize movement of the mechanisms relative to one another.

I claim:
1. An indexing device comprising a first mechanism, and a second mechanism for intermittently driving the first mechanism, said first mechanism including:
    (a) a pair of spaced, oppositely disposed circular slots for receiving pins; and said second mechanism including:
    (b) a first pin movable into one of said pair of slots for engaging and accelerating the first mechanism from a standstill; and
    (c) a second pin spaced from, and movable in unison with said first pin for moving into the other of said pair of slots for engaging and decelerating the first mechanism back to a standstill.

2. The indexing motion device of Claim 1, wherein the radius (P) of the circular slots is greater than $$\frac{R(A - A\cos\alpha)}{A - 2R + A\cos\alpha} \quad \text{(Formula II)}$$

where (R) is the radial distance of the pins measured from the center point about which the second mechanism rotates, (A) is the distance between the center points about which the first and second mechanism rotate; and angle alpha ($\alpha$) is one-fourth of the total angular input motion for accelerating and decelerating the first mechanism from and back to a standstill.

3. The indexing motion device of claim 1, wherein the radius (P) of the circular slots is greater than the radial pin distance (R) where (R) is the radial distance of the pins measured from the center point about which the second mechanism rotates.

4. The indexing motion device of claim 1 wherein the radius (P) of the circular slots is greater than $$\frac{R(A - A\cos\alpha)}{A - 2R + A\cos\alpha}$$

(Formula VI)

where R is the radial distance of the pins measured from the center point about which second mechanism rotates, A is the distance between the center points about which the first and second mechanisms rotate, and angle alpha ($\alpha$) is one-fourth of the total angular input motion for accelerating and decelerating the first mechanism from and back to a standstill.

5. The indexing motion device of claim 1, wherein the radius (P) of the circular slots is greater than $$AR\left[\frac{(1 - \cos\alpha)}{2R + A(1 + \cos\alpha)}\right]$$

(Formula VIII)

where A, is the distance between the center points about which the first and second mechanisms rotate, R is the radial distance of the pins measured from the center point about which the second mechanism rotates, and angle alpha ($\alpha$) is one-fourth of the total angular input motion for accelerating and decelerating the first mechanism from and back to a standstill.

6. The indexing motion device of claim 1, wherein the radius (P) of the circular slots is greater than $$\frac{\alpha_s}{4\cot\beta} \quad \text{(Formula XI)}$$

where $\alpha_s$ is one-fourth of the total linear input for accelerating and decelerating the first mechanism from and back to a standstill, and angle $\beta$ is one-fourth of the total angular output motion.

7. The indexing motion device of claim 1, wherein the radius (P) of the circular slots is greater than $$\frac{R(1 - \cos\alpha)}{1 + \cos\alpha} \quad \text{(Formula XIII)}$$

where R is the radial distance of the pins measured from the center point about which the second mechanism rotates, and angle ($\alpha$) is one-fourth of the total angular input motion for accelerating and decelerating the first mechanism from and back to a standstill.

8. The indexing motion device of claim 1, which includes:
    (d) means disposed on the second mechanism intermediate said accelerating and decelerating pins, for uniformly driving the first mechanism through a predetermined arc; and
    (e) means disposed on the first mechanism intermediate said pin receiving slots for matingly engaging said uniform driving means.

9. The indexing motion device of claim 8, wherein the means (d) and (e) comprise mating toothed segments.

10. The indexing motion device of claim 1, which includes:
    (d) a locking drum disposed on the second mechanism and movable therewith, said drum having opposing ends;
    (e) a locking shoe disposed on the first mechanism and movable therewith, said shoe having opposing ends and matingly configured to engage the drum and maintain the first mechanism at a standstill;
    (f) a key projecting from the opposing ends of the locking drum;
    (g) a recess disposed in the opposing ends of the locking shoe and matingly configured to receive and let the keys pass therethrough as the drum and shoe ends move past each other.

11. In an indexing device comprising a first mechanism with a locking shoe and a second mechanism with a locking drum, intermittently driving the first mechanism, the improvement which comprises:
    (a) a key projecting from opposing ends of the locking drum;
    (b) a recess disposed in opposing ends of the locking shoe adjacent the drum and matingly configured to receive and let the keys pass therethrough, whereby engagement between the drum and shoe is extended without hindering relative movement of the first and second mechanisms with respect to each other.

References Cited

UNITED STATES PATENTS

| | | | |
|---|---|---|---|
| 699,910 | 5/1902 | Cyr | 74—436 |
| 2,307,886 | 1/1943 | Hansson | 74—436 X |
| 2,512,894 | 6/1950 | Gieskieng | 74—436 |
| 2,890,590 | 6/1959 | O'Harah | 74—436 X |
| 2,928,284 | 3/1960 | Walls | 74—436 X |
| 3,236,116 | 2/1966 | Hafferkamp et al. | 74—820 X |

MILTON KAUFMAN, *Primary Examiner.*

U.S. Cl. X.R.

74—84, 436

UNITED STATES PATENT OFFICE
CERTIFICATE OF CORRECTION

Patent No. 3,443,455                                  May 13, 1969

Martin J. Zugel

It is certified that error appears in the above identified patent and that said Letters Patent are hereby corrected as shown below:

Column 5, lines 17 and 18, formula III should appear as shown below:

$$R = A \frac{\sin \beta}{\sin (\alpha + \beta)}$$

same column 5, lines 70 and 71, formula VIII should appear as shown below:

$$\text{minimum } P > AR \left[ \frac{1-\cos\alpha}{2R + A(1 + \cos\alpha)} \right]$$

Column 6, lines 26 and 27, formula XI should appear as shown below:

$$\text{minimum } P \quad \frac{a_s}{4\cot\beta}$$

same column 6, lines 45 and 46, "minimums" should read -- minimum --. Column 8, line 34, after "toothed" insert -- gear --.

Signed and sealed this 21st day of April 1970.

(SEAL)
Attest:

EDWARD M. FLETCHER, JR.                         WILLIAM E. SCHUYLER, JR.
Attesting Officer                                       Commissioner of Patents